United States Patent
Heitmann

(10) Patent No.: US 7,085,276 B1
(45) Date of Patent: Aug. 1, 2006

(54) SYSTEM FOR SYNCHRONIZING COMMUNICATIONS SYSTEM COMPONENTS COUPLED VIA A COMMUNICATIONS NETWORK

(75) Inventor: Juergen Heitmann, Neuried (DE)

(73) Assignee: Siemens Aktiengesellschaft, Munich (DE)

( * ) Notice: Subject to any disclaimer, the term of this patent is extended or adjusted under 35 U.S.C. 154(b) by 1037 days.

(21) Appl. No.: 10/088,130

(22) PCT Filed: Sep. 7, 2000

(86) PCT No.: PCT/DE00/03105

§ 371 (c)(1),
(2), (4) Date: Mar. 13, 2002

(87) PCT Pub. No.: WO01/20827

PCT Pub. Date: Mar. 22, 2001

(30) Foreign Application Priority Data

Sep. 13, 1999 (DE) ................................ 199 43 779

(51) Int. Cl.
*H04J 3/06* (2006.01)
*H04J 3/24* (2006.01)

(52) U.S. Cl. .................. 370/395.4; 370/473; 370/503

(58) Field of Classification Search ........ 370/338–395, 370/473–503, 516–537; 709/223–224
See application file for complete search history.

(56) References Cited

U.S. PATENT DOCUMENTS

| | | | |
|---|---|---|---|
| 4,894,846 A * | 1/1990 | Fine ........................... | 375/356 |
| 5,533,021 A * | 7/1996 | Branstad et al. ............ | 370/396 |
| 5,822,317 A | 10/1998 | Shibata | |
| 6,317,475 B1 * | 11/2001 | Kasurinen .................... | 375/356 |
| 6,516,419 B1 * | 2/2003 | Kawamoto ................... | 713/400 |
| 6,560,245 B1 * | 5/2003 | Slater ......................... | 370/537 |
| 6,707,828 B1 * | 3/2004 | Wolf .......................... | 370/503 |
| 6,714,563 B1 * | 3/2004 | Kushi ......................... | 370/503 |
| 6,757,304 B1 * | 6/2004 | Nomura et al. ............. | 370/516 |
| 6,990,517 B1 * | 1/2006 | Bevan et al. ............... | 709/223 |
| 2005/0237928 A1 * | 10/2005 | Le Scolan et al. .......... | 370/223 |

FOREIGN PATENT DOCUMENTS

| | | |
|---|---|---|
| DE | 43 19 066 1 | 12/1994 |
| DE | 196 25 219 C1 | 10/1997 |
| DE | 197 57 367 A1 | 7/1999 |
| EP | 0 350 149 | 1/1990 |
| EP | 0 450 269 A2 | 10/1991 |
| EP | 0 697 774 A1 | 2/1996 |
| EP | 0 722 233 A2 | 7/1996 |

* cited by examiner

*Primary Examiner*—Man U. Phan
(74) *Attorney, Agent, or Firm*—Bell, Boyd & Lloyd LLC

(57) ABSTRACT

To synchronize communications system components coupled via a communications network, a time information transmitter is provided which is used to transmit time information, possibly on request, relating to the communications system components. The communications system components each have a clock generator, which needs to be synchronized, and a real time clock, where the clock generator both determines the transmission rate for communications data which are to be transmitted and prescribes the time base for the real time clock. In addition, the communications system components each have a comparison device for comparing received time information with a current time value indicated by the real time clock, and a clock frequency controller for regulating the clock frequency of the clock generator on the basis of the comparison result.

14 Claims, 1 Drawing Sheet

SYSTEM FOR SYNCHRONIZING COMMUNICATIONS SYSTEM COMPONENTS COUPLED VIA A COMMUNICATIONS NETWORK

BACKGROUND OF THE INVENTION

In the course of current development taking place, communications systems and control thereof are becoming increasingly decentralized. In this regard, a communications system is split into individual subsystems coupled via a communications network, such as a local area network (LAN) or a network based on an internet protocol (IP). This allows, by way of example, components of a relatively large exchange to be distributed over a communications network.

Contemporary communications systems normally provide a large number of communications services and service features. For some of these communications services and service features, such as for "CBO services" (continuous bit stream operation), which include fax, modem, voice and video transmissions, it is necessary for the respective communications system components involved to be in sync for communications data which are to be transmitted.

Arrangements for synchronizing communications system components coupled via a communications network are known in communications networks using direct SDH (synchronous digital hierarchy) or PDH (plesiochronous digital hierarchy) based transmission; e.g.; from section 8 of ITU-T recommendation G.803 and the references indicated therein. In this case, a reference clock is transmitted to the communications system components which are to be synchronized on the physical layer of the transmission protocol used. However, transmitting a reference clock in the physical layer requires continuous layer 1 connections to the individual communications system components. As such, relatively complex communications network structures can be produced only with a great deal of effort, however. In communications networks which can be configured more flexibly, such as local area networks (LAN) or internet protocol based networks, continuous layer 1 connections generally are not provided.

It is an object of the present invention to specify a system which is more flexible than the prior art in order to synchronize communications system components coupled via a communications network for communications data which are to be transmitted.

SUMMARY OF THE INVENTION

Accordingly, pursuant to the present invention, to synchronize communications system components coupled via a communications network, they are sent time information from a time information transmitter. The communications system components' orienting of a respectively dedicated time dimension to respective time information received from the time information transmitter synchronizes these communications system components with one another.

A communications system component is synchronized by readjusting the clock frequency of a clock generator intended to prescribe the transmission data rate for communications data whose transmission involves the communications system component in question. In this case, the clock frequency is readjusted by comparing received time information with a current time value on a real time clock whose timing is controlled, in accordance with the present invention, by a timing pulse from the clock generator actually provided for prescribing the transmission data rate for communications data which are to be transmitted. The readjustment of the clock generator's clock frequency is thus indirectly used to adjust the real time clock itself on the basis of the time information received. This indirect adjustment prevents abrupt changes in the time indicated by the real time clock and attenuates effects of delay time fluctuations in received time information.

The inventive system is largely independent of the type of communications network coupling the communications system components. Thus, by way of example, the communications network used can be a "local area network" (LAN) or an internet protocol based communications network.

In accordance with one advantageous embodiment of the present invention, the clock generator in a communications system component can be temperature stabilized or temperature compensated. To increase the clock accuracy, the clock generator also can be produced on the basis of the "2-oscillator concept". In this context, a main oscillator and a temperature stabilized or temperature compensated reference oscillator which regulates the clock frequency of the main oscillator and otherwise freewheels is provided. The more accurate the clock generator in a communications system component, the longer the time intervals for which the communications system component in question remains in sync even without receiving time information.

In accordance with another advantageous embodiment of the present invention, a communications system component can be sent the time information wirelessly; e.g., from a GPS satellite (global positioning system), from a time signal transmitter, such as DCF77, or from a time information transmitter associated with the communications system. For this purpose, the time information reception device in the communications system component in question has a radio reception device for wirelessly receiving the time information. Due to the very short delay time for time information transmitted by radio, this allows very accurate synchronization to be achieved.

Alternatively, a communications system component also can be sent time information via the communications network from a time information transmitter, such as in the form of a time information server, which is likewise coupled to the communications network. As such, an existing network infrastructure also can be used for synchronizing the communications system components. This alternative allows a complex radio reception device to be dispensed with in the communications system components which are to be synchronized. Instead, time information easily can be received by coupling the time information reception device in a communications system component to the communications network via a network interface and providing it with the ability to extract time information from a data stream transmitted via the communications network.

In accordance with one advantageous embodiment of the present invention, a communications system component can have a time request device so that it can request time information from the time information transmitter via the communications network. In this case, the request can be made preferably using known network protocols, such as the "network time protocol" (NTP) or the "digital time synchronization protocol" (DTSS).

To improve the accuracy of synchronization, a communications system component can have a timing device for measuring the time difference between a request for and reception of time information, and a delay time determination device for ascertaining an estimate of the delay time for the time information from the time information transmitter to the communications system component on the basis of the measured time difference. Assuming that the delay time for the request approximately matches the delay time for the time information, the delay time for the time information is then found to be half the measured time difference. The accuracy of the estimate of the delay time for time information can be increased by determining the estimate from a mean value for time differences measured for a number of requests, or variables derived from the time differences. This makes it possible to compensate for delay time fluctuations for the data transmitted via the communications network. Accordingly, the comparison device in the communications system component can be designed such that the ascertained estimate of the delay time for the time information is taken into account in the comparison result; e.g., by correcting the time information or the time value indicated by the real time clock.

The frequency with which time information is requested by a communications system component can be dependent on various criteria, such as the accuracy of the clock generator, the range of variation of the time differences measured between a request for and reception of time information and/or the magnitude of a clock generator error ascertained upon prior adjustment of the clock generator. Preferably, the time request device can be designed such that time information is requested more frequently the less accurate the clock generator and the greater the range of variation of the measured time differences or of the ascertained clock generator error.

In accordance with another advantageous embodiment of the present invention, a communications system component can have an input buffer, operating on the basis of the continuity principle ("first-in-first-out", FIFO), for buffering a data stream received via the communications network. In this case, the input buffer is coupled to the clock generator such that data elements in a buffered data stream are read with timing determined by the clock generator. The input buffer also has a filling level detection device coupled to it which can be used to detect the filling level of the input buffer.

A clock frequency controller therefore can be used to readjust the clock frequency of the clock generator on the basis of the detected filling level. Assuming that, at least when averaged over time, the data stream received via the communications network is sent using a data rate prescribed by a clock generator in a respective data stream transmitter, this allows the clock generator in the communications system component to be synchronized with the clock generator in the data stream transmitter when averaged over time. To compensate for brief delay time fluctuations for data elements in the data stream, an integration element can be provided which is used to supply a clock frequency regulation signal derived from the filling level to the clock generator.

For the purposes of clock frequency regulation, a data stream of communications data received via the communications network, such as voice data, preferably can be used. Since communications data, particularly voice data, are frequently transmitted at a precisely maintained transmission rate oriented to the timing of the transmitter for the communications data when a connection has been set up, the clock frequency of the clock generator can be stabilized fairly precisely using received communications or voice data.

In accordance with another advantageous embodiment of the present invention, the time information transmitter can have a detector device which can be used to ascertain a temporarily low transmission volume, such as for user and/or signaling data, in the communications network. A transmission controller in the time information transmitter then can be used to trigger transmission of time information when the ascertained transmission volume falls below a prescribed limit.

Additional features and advantages of the present invention are described in, and will be apparent from, the following Detailed Description of the Invention and the Figures.

DETAILED DESCRIPTION OF THE INVENTION

Figure 1:
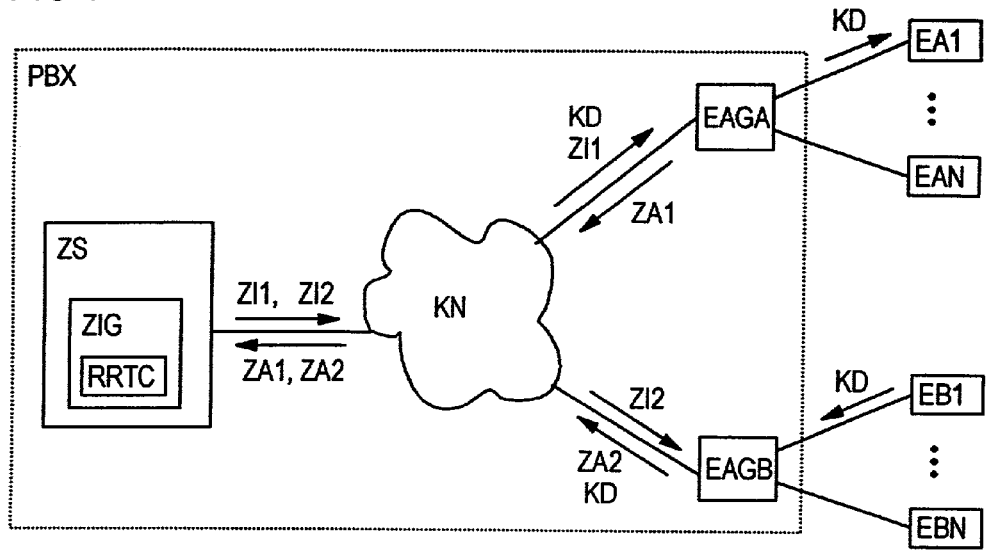
FIG. 1 shows a schematic illustration of a communications system with an exchange distributed over a communications network.

FIG. 1 shows, schematically, a communications system with an exchange PBX distributed over a communications network KN and terminals EA1, . . . , EAN, and EB1, . . . , EBN connected to the exchange. In this arrangement, the exchange PBX has a central controller ZS and terminal connection groups EAGA and EAGB as communications system components coupled via the communications network KN. The terminal connection groups belong to the "peripheral section" of the exchange PBX. The terminal connection group EAGA couples the terminals EA1, . . . , EAN to the exchange PBX, and the terminal connection group EAGB couples the terminals EB1, . . . , EBN to the exchange PBX. The central controller ZS, for its part, has a time information transmitter ZIG having a reference real time clock RRTC. The reference real time clock RRTC can be adjusted on the basis of world time information received from a satellite; for example, using a GPS (global positioning system) receiver.

The communications network KN, which can be in the form of a local area network (LAN) or an internet protocol based network, for example, can have not only the communications system components ZS, EAGA, EAGB but also data processing devices (not shown) coupled to it. A communications network in the form of a local area network (LAN) or internet protocol based network very easily can be extended and have other communications and/or data processing devices added to it and, hence, can be matched very flexibly even to a great diversity of requirements. In the present exemplary embodiment, the communications network KN is used for transmitting both any communications data and any control data between the terminal connection groups EAGA, EAGB and the central controller ZS.

In the present exemplary embodiment, an existing connection is used to transmit communications data KD, such as voice data, from the terminal EB1 to the terminal EA1 via the terminal connection group EAGA, the communications network KN and the terminal connection group EAGB. Setup of the connection previously has been prompted by the central controller ZS by virtue of the terminal connection groups EAGA, EAGB being sent respective address information, among other things, which identifies the respective other terminal connection group in the communications network KN. Accordingly, the terminal connection group EAGB provides the communications data KD to be transmitted with the address information identifying the terminal connection group EAGA, and the communications data KD are thus transmitted via the communications network KN to the terminal connection group EAGA, which finally forwards the communications data KD to the terminal EA1.

To synchronize the terminal connection groups EAGA and EAGB with one another, each of the terminal connection groups EAGA and EAGB is independently synchronized with the time information transmitter ZIG in the central controller ZS. In this case, synchronization takes place over the communications network KN. To this end, the terminal connection groups EAGA and EAGB send a respective time request message ZA1 or ZA2, such as on the basis of the "network time protocol" (NTP), to the time information transmitter ZIG via the communications network KN. The received time request messages ZA1, ZA2 prompt the time information transmitter to request respective current time information ZI1 or ZI2 from the reference real time clock RRTC and then to transmit it, having been provided with address information which identifies the terminal connection group EAGA or EAGB, to the respectively addressed terminal connection group EAGA or EAGB via the communications network KN.

Figure 2:
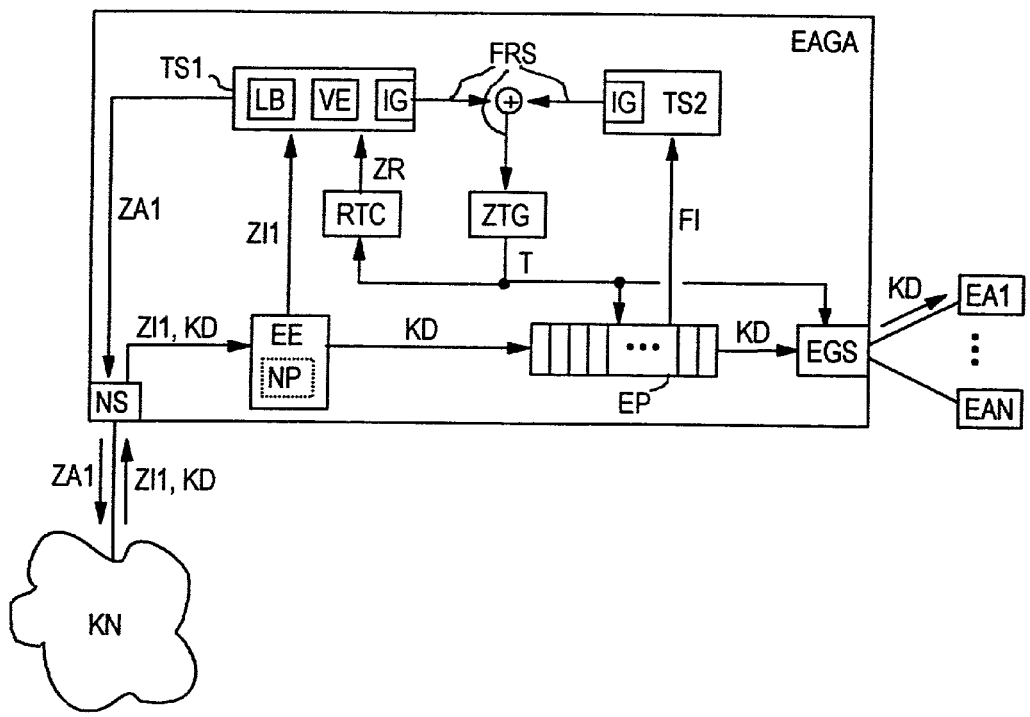
FIG. 2 shows a schematic illustration of a terminal connection group for the distributed exchange.

FIG. 2 shows a more detailed illustration of the terminal connection group EAGA. The terminal connection group EAGA, which is coupled to the communications network KN via a network interface NS, has a reception device EE, an input buffer EP, a real time clock RTC, a clock generator ZTG, two clock frequency controllers TS1 and TS2 and a terminal interface EGS as further functional components. The terminal interface EGS, which can be in the form of a series of S0 interfaces based on the ISDN standard, for example, connects the terminals EA1, . . . , EAN. The clock frequency controller TS1, for its part, has a comparison device VE, a delay time determination device LB, and an integration element IG. For reasons of clarity, other functional components of the terminal connection group EAGA which make no direct contribution to understanding the present invention have not been shown. The functional components which are shown each can be produced using software modules running on a system processor in the terminal connection group EAGA.

The clock generator ZTG, which, by way of example, can be in the form of a "TCXO" (temperature compensated x-tal oscillator), an "OCXO" (oven controlled x-tal oscillator) or a "TCVCXO" (temperature compensated voltage controlled x-tal oscillator), provides a clock signal T which is supplied to the real time clock RTC, to the input buffer EP and to the terminal interface EGS in order to control timing. The frequency of the clock signal T from the clock generator ZTG can be regulated within prescribed limits in this case. The clock signal T forms both the time base for the real time clock RTC and the time base for the data rate at which the communications data KD are transmitted via the terminal interface EGS; e.g., 64 kbit/s for an ISDN base channel.

To synchronize the clock generator ZTG with the time dimension for the time information transmitter ZIG, the clock frequency controller TS1 uses the network interface NS to send the time request message ZA1 to the time information transmitter ZIG via the communications network KN. The transmission time stored for the time request message ZA1 is a current time value indicated by the real time clock RTC.

The time request message ZA1 prompts the time information transmitter ZIG, as already stated above, to transmit the time information ZI1 to the terminal connection group EAGA via the communications network KN. The network interface NS in the terminal connection group EAGA forwards the time information ZI1 to the reception device EE, where the time information ZI1 is extracted from a data stream which has been received via the communications network KN and also contains the communications data KD. The time information ZI1 is extracted in the reception device EE using a network protocol software module NP which is implemented for this purpose and which recognizes the time information ZI1 on the basis of identification information identifying time information. This can be done, by way of example, on the basis of the "network time protocol" (NTP) or the "digital time synchronization protocol" (DTSS). The extracted time information ZI1 is forwarded by the reception device EE to the clock frequency controller TS1, which determines the reception time for the time information ZI1 as the current time value ZR indicated by the real time clock RTC and evaluates the time information content of the time information ZI1. If the terminal connection group EAGA is governed by a local time, the time information content of the time information ZI1 can be converted to the locally used time; e.g., using stored tables. Such conversion may be necessary, for example, when the terminal connection group EAGA and the time information transmitter ZIG are in different time zones or are oriented to different reference times, such as GPS time (global positioning system) and UTC time (universal time coordinated).

The delay time determination device LB furthermore estimates the delay time for the time information ZI1 in the communications network KN as half the time difference between the ascertained reception time ZR for the time information ZI1 and the stored transmission time for the time request message ZA1. To increase the accuracy of delay time determination and to compensate for brief delay time fluctuations in the communications network KN, the value obtained for the delay time is averaged with values determined earlier for the delay time. Preferably, a sliding mean value is determined. If appropriate, a time stamp for the time information ZI1 also can be included in the delay time determination.

The time indicated by the time information content of the time information ZI1, and possibly matched to the locally used time, and also the value determined for the delay time are then supplied to the comparison device VE. The comparison device VE corrects the transmitted time by the value obtained for the delay time for the time Information ZI1; e.g., by adding the two variables. The comparison device VE then compares the correct time with the time ZR indicated by the real time clock RTC for the reception time of the time information ZI1. Depending on the comparison result, a frequency regulation signal FRS is then formed to control the clock frequency of the clock generator ZTG. If the time indicated by the real time clock RTC is ahead of the corrected time derived from the time information ZI1, this involves forming a frequency regulation signal FRS for reducing the clock frequency of the clock generator ZTG. Accordingly, if the real time clock RTC is behind, a frequency regulation signal FRS for increasing the clock frequency is produced. The frequency regulation signal FRS is output by the clock frequency controller TS1 via the time-based integration element IG, whose time constant is proportioned such that delay time fluctuations typically arising in the communications network KN are compensated for. Preferably, if comparatively large discrepancies arise between the real time clock RTC and the time derived from the time information ZI1, the clock frequency controller TS1 can request time information from the time information transmitter ZIG at relatively short time intervals. In addition, a maximum discrepancy between the real time clock RTC and a time derived from received time information can be prescribed and, if this is exceeded, the real time clock RTC is readjusted directly; i.e., by altering the time it indicates.

In the time intervals between respective reception of time information, the clock frequency of the clock generator ZTG is stabilized using the communications data KD likewise received via the communications network KN. To this end, the communications data KD are supplied to the input of the input buffer EP by the receiver device EE. The input buffer is in the form of a "first-in-first-out memory" from which buffered data are read in the order of time in which they were stored. A first-in-first-out memory is frequently also referred to as a FIFO. The communications data KD buffered in the input buffer EP are read therefrom as stipulated by the clock signal T supplied by the clock generator ZTG and are supplied to the terminal interface EGS. This is used for finally transmitting the communications data KD to the terminal EA1.

Generally, communications data, and particularly voice data with a constant data rate strictly oriented to the timing of the transmitter for the communications data, are sent. Despite any delay time fluctuations to which such communications data sent at a constant data rate are subject, these communications data arrive at a receiver at the same data rate, at least when averaged over time. It is thus possible to use the time average for the data rate of received communications data to synchronize a receiver of these communications data with the timing of the transmitter.

In the present exemplary embodiment, the communications data KD sent at a constant data rate from the terminal connection group EAGB to the terminal connection group EAGA via the communications network KN are used to stabilize the clock frequency of the clock generator ZTG in the terminal connection group EAGA during the time interval between individual requests for time information. For this purpose, the terminal connection group EAGA detects the respectively current filling level of the input buffer EP (i.e., the limit up to which the input buffer EP is filled with communications data KD), at regular time intervals, and this filling level is transmitted to the clock frequency controller TS2 in the form of filling level information FI. On the basis of the filling level information FI, the clock frequency controller TS2 forms a frequency regulation signal FRS which is output via an integration element IG and is combined with the frequency regulation signal formed by the clock frequency controller TS1 in order to regulate the clock frequency of the clock generator ZTG. The time constant of the integration element IG in the clock frequency controller TS2 is proportioned such that delay time fluctuations typically arising in the communications network KN for the communications data KD are compensated for. The integration elements IG in the clock frequency controllers TS1 and TS2 can be produced, by way of example, using a digital circuit for forming sliding mean values. If the filling level of the input buffer EP is above average, the clock frequency controller TS2 forms a frequency regulation signal FRS for increasing the clock frequency of the clock generator ZTG, whereas if the filling level is below average, a frequency regulation signal for reducing the clock frequency is formed. The frequency regulation signals FRS formed by the clock controllers TS1 and TS2 each can be supplied to the clock generator ZTG in a form combined with prescribed weighting factors. In this context, the frequency regulation signal formed by the clock frequency controller TS1 is preferably given a higher weighting than that formed by the clock frequency controller TS2. Due to the additional stabilization of the clock frequency of the clock generator ZTG on the basis of the filling level of the input buffer EP, it is possible to ensure synchronism between the terminal connection groups EAGA and EAGB even during comparatively long time intervals between individual time requests.

So that a prescribed accuracy of synchronization for the terminal connection groups EAGA and EAGB is also ensured across relatively large communications networks KN, network elements in the communications network, such as "repeaters" and/or "routers", can be arranged such that the respective number of network elements connected between the time information transmitter ZIG and the respective terminal connection group EAGA or EAGB and of network elements connected between the terminal connection groups EAGA and EAGB does not exceed a respectively prescribed number.

Although the present invention has been described with reference to specific embodiments, those of skill in the art will recognize that changes may be made thereto without departing from the spirit and scope of the invention as set forth in the hereafter appended claims.

The invention claimed is:

1. A system for synchronizing communications system components coupled via a communications network, comprising:
   a time information transmitter for transmitting time information relating to the communications system components;
   a time information reception device in each system component for receiving time information from the time information transmitter;
   a clock generator in each system component with a controllable clock frequency for prescribing a transmission data rate for communication data which are to be transmitted;
   a real time clock in each system component whose timing is controlled by the clock generator;
   a comparison device in each system component for comparing received time information with a current time value indicated by the real time clock;
   a clock frequency controller in each system component for controlling the clock frequency of the clock generator based on a comparison result from the comparison device;
   an input buffer in each system component for buffering a data stream received via the communications network, where reading of data elements in the data stream from the input buffer is determined by the clock frequency of the clock generator;
   a filling level detection device in each system component for detecting a filling level of the input buffer; and
   a clock frequency controller in each system component for readjusting the clock frequency of the clock generator based on the detected filling level.

2. A system for synchronizing communications system components as claimed in claim 1, wherein the clock generator in a system component is one of temperature stabilized and temperature compensated.

3. A system for synchronizing communications system components as claimed in claim 1, wherein the clock generator in a system component is produced by a main oscillator outputting a timing pulse and by a reference oscillator which regulates the clock frequency of the main oscillator and otherwise freewheels, the reference oscillator being one of temperature stabilized and temperature compensated.

4. A system for synchronizing communications system components as claimed in claim 1, wherein the time information reception device in a system component includes a radio reception device for wireless reception of time information from the time information transmitter.

5. A system for synchronizing communications system components as claimed in claim 1, wherein the time information reception device in a system component is coupled to the communications network via a network interface, and may extract time information from a data stream transmitted to the system component via the communications network.

6. A system for synchronizing communications system components as claimed in claim 5, further comprising a time request device in each system component for requesting time information from the time information transmitter.

7. A system for synchronizing communications system components as claimed in claim 6, further comprising:
   a timing device in each system component for measuring a time difference between a request for and reception of time information;
   a delay time determination device in each system component for ascertaining an estimate for the delay time for the time information from the time information transmitter to the respective system component based on the measured time difference; and
   a comparison device in each system component for comparing received time information with a current time value indicated by the real time clock, taking into account the estimated delay time.

8. A system for synchronizing communications system components as claimed in claim 7, wherein the timing device is produced using the real time clock.

9. A system for synchronizing communications system components as claimed in claim 7, further comprising a delay time determination device in each system component for ascertaining the estimate of the delay time based on one of averaging over a plurality of measured time differences and variables derived from the averaging.

10. A system for synchronizing communications system components as claimed in claim 6, further comprising a time request device in each system component for requesting time information at time intervals which are dependent on how greatly the measured time differences vary.

11. A system for synchronizing communications system components as claimed in claim 6, further comprising a time request device in each system component for requesting time information at time intervals which are dependent on the comparison result from the comparison device.

12. A system for synchronizing communications system components as claimed in claim 1, wherein the data stream to be buffered includes communications user data received via the communications network.

13. A system for synchronizing communications system components as claimed in claim 1, wherein the time information transmitter in a system component includes a detector device for ascertaining a temporarily low transmission volume in the communications network and a transmission controller for triggering transmission of time information when a low transmission volume is ascertained.

14. A system for synchronizing communications system components as claimed in claim 1, further comprising a PLL circuit in each system component for regulating the clock frequency of the clock generator.

* * * * *